US011371656B2

(12) United States Patent
Ito et al.

(10) Patent No.: US 11,371,656 B2
(45) Date of Patent: Jun. 28, 2022

(54) INSPECTION APPARATUS FOR HYDROGEN GAS DISPENSER

(71) Applicant: Iwatani Corporation, Osaka (JP)

(72) Inventors: Masaru Ito, Amagasaki (JP); Goichi Inoue, Amagasaki (JP); Koichi Tsuda, Tokyo (JP)

(73) Assignee: IWATANI CORPORATION, Osaka (JP)

( * ) Notice: Subject to any disclaimer, the term of this patent is extended or adjusted under 35 U.S.C. 154(b) by 0 days.

(21) Appl. No.: 16/646,751

(22) PCT Filed: Feb. 28, 2019

(86) PCT No.: PCT/JP2019/007742
§ 371 (c)(1),
(2) Date: Mar. 12, 2020

(87) PCT Pub. No.: WO2020/157996
PCT Pub. Date: Aug. 6, 2020

(65) Prior Publication Data
US 2020/0386369 A1 Dec. 10, 2020

(30) Foreign Application Priority Data
Feb. 1, 2019 (JP) .............................. JP2019-017291

(51) Int. Cl.
*F17C 13/02* (2006.01)
*F17C 5/06* (2006.01)

(52) U.S. Cl.
CPC .............. *F17C 13/025* (2013.01); *F17C 5/06* (2013.01); *F17C 2221/012* (2013.01);
(Continued)

(58) Field of Classification Search
CPC .... F17C 13/025; F17C 5/06; F17C 2265/065; F17C 2250/043; F17C 2221/012;
(Continued)

(56) References Cited

U.S. PATENT DOCUMENTS 2,948,306 A * 8/1960 Kuraeff ..................... B64F 1/28
141/231
3,902,874 A * 9/1975 McAndrew .......... B67D 7/0476
95/146

(Continued)

FOREIGN PATENT DOCUMENTS

CN 205670035 U 11/2016
EP 3 299 775 A1 3/2018
(Continued)

OTHER PUBLICATIONS

International Search Report in Japanese dated May 7, 2019, issued in counterpart International Application No. PCT/JP2019/007742 (3 pages).
(Continued)

*Primary Examiner* — Timothy L Maust
*Assistant Examiner* — James R Hakomaki
(74) *Attorney, Agent, or Firm* — WHDA, LLP

(57) ABSTRACT

An inspection apparatus A for a hydrogen gas dispenser includes a receiving-side gas flowing unit 1 including a receptacle 11 configured to be connected to a nozzle C1 of a hydrogen gas dispenser C and an inspection unit including a rate-of-pressure-rise inspection unit 2 configured to measure a rate of pressure rise of hydrogen gas from the hydrogen gas dispenser C and a dispensed-amount inspection unit 3 configured to measure a dispensed amount of the hydrogen gas. The inspection apparatus A for a hydrogen gas dispenser is capable of measuring a dispensed amount and a rate of pressure rise of the hydrogen gas dispenser.

6 Claims, 2 Drawing Sheets

(52) U.S. Cl.
CPC .............. *F17C 2250/043* (2013.01); *F17C 2250/0443* (2013.01); *F17C 2265/065* (2013.01)

(58) Field of Classification Search
CPC .......... F17C 2250/0443; F17C 2227/04; F17C 2250/0434; F17C 2260/024; F17C 2270/0168; H01M 8/04
USPC ............................................................. 141/4
See application file for complete search history.

(56) References Cited

U.S. PATENT DOCUMENTS

| | | | | |
|---|---|---|---|---|
| 4,009,985 | A * | 3/1977 | Hirt | B67D 7/0476 431/5 |
| 4,646,940 | A * | 3/1987 | Kramer | F17C 13/025 141/197 |
| 4,886,282 | A * | 12/1989 | Wilkinson | B60P 3/14 182/132 |
| 6,047,250 | A * | 4/2000 | Beaudoin | G01F 1/065 702/188 |
| 6,341,629 | B1 * | 1/2002 | Clark | B67D 7/342 141/83 |
| 6,904,944 | B2 | 6/2005 | Satou et al. | |
| 7,159,625 | B1 * | 1/2007 | Klutts | B60K 15/04 141/83 |
| 7,568,507 | B2 * | 8/2009 | Farese | F17C 5/06 141/95 |
| 7,689,371 | B2 * | 3/2010 | Memmott | G05B 15/02 702/55 |
| 8,360,112 | B2 * | 1/2013 | Allidieres | F17C 7/00 141/47 |
| 9,823,665 | B2 * | 11/2017 | Finnell | B67D 7/342 |
| 10,883,664 | B2 * | 1/2021 | Heydorn | F17C 13/005 |
| 2002/0053365 | A1 * | 5/2002 | Mutter | F17C 13/026 141/4 |
| 2005/0178432 | A1 * | 8/2005 | Porter | H01M 16/003 137/14 |
| 2006/0121326 | A1 * | 6/2006 | Hiramatsu | H01M 8/04231 429/410 |
| 2006/0157149 | A1 * | 7/2006 | Hillam | B67D 7/348 141/198 |
| 2007/0077472 | A1 * | 4/2007 | Uehara | H01M 8/04425 429/415 |
| 2007/0079892 | A1 * | 4/2007 | Cohen | F17C 5/06 141/105 |
| 2008/0000542 | A1 * | 1/2008 | Cohen | F17C 7/00 141/18 |
| 2009/0205745 | A1 * | 8/2009 | Farese | F17C 5/007 141/12 |
| 2009/0207577 | A1 * | 8/2009 | Fransen | H01R 13/514 361/790 |
| 2009/0277531 | A1 * | 11/2009 | Pongraz | F17C 5/06 141/4 |
| 2011/0259426 | A1 * | 10/2011 | Cramer | F17C 13/045 137/1 |
| 2012/0267002 | A1 * | 10/2012 | Kittilsen | F17C 13/02 141/4 |
| 2014/0196814 | A1 * | 7/2014 | Nagura | F17C 13/026 141/82 |
| 2014/0216599 | A1 | 8/2014 | Loewenthal | |
| 2014/0290790 | A1 * | 10/2014 | Mathison | F17C 5/007 141/94 |
| 2015/0153005 | A1 * | 6/2015 | Takano | F17C 5/007 141/227 |
| 2015/0300570 | A1 * | 10/2015 | Beuneken | F17C 7/02 141/4 |
| 2015/0377416 | A1 * | 12/2015 | Miyoshi | G05D 7/0635 141/95 |
| 2016/0273713 | A1 * | 9/2016 | Lee | F17C 5/06 |
| 2016/0305611 | A1 * | 10/2016 | Handa | F17C 13/023 |
| 2017/0089754 | A1 | 3/2017 | Otaki et al. | |
| 2017/0248975 | A1 * | 8/2017 | Mortensen | F17C 7/00 |
| 2017/0336028 | A1 * | 11/2017 | Cohen | F17C 13/04 |
| 2018/0335181 | A1 * | 11/2018 | Sinding | F17C 5/04 |
| 2019/0093826 | A1 * | 3/2019 | Araki | F17C 13/025 |
| 2020/0041323 | A1 | 2/2020 | Francois | |
| 2020/0173607 | A1 * | 6/2020 | Mathison | F17C 13/026 |

FOREIGN PATENT DOCUMENTS

| | | |
|---|---|---|
| EP | 3 299 776 A1 | 3/2018 |
| EP | 3 299 777 A1 | 3/2018 |
| EP | 3 299 778 A1 | 3/2018 |
| FR | 3065069 A1 | 10/2018 |
| JP | 2007-24152 A | 2/2007 |
| JP | 2010-1919 A | 1/2010 |
| JP | 2017-67472 A | 4/2017 |
| JP | 2017-75635 A | 4/2017 |
| JP | 2017-115909 A | 6/2017 |
| JP | 2017-180612 A | 10/2017 |
| JP | 2017-181215 A | 10/2017 |
| KR | 10-0923645 B1 | 10/2009 |
| WO | 2019/188058 A1 | 10/2019 |

OTHER PUBLICATIONS

Written Opinion dated May 7, 2019, issued in counterpart International Application No. PCT/JP2019/00//42, w/English translation (6 pages).
Decision to Grant a Patent dated Oct. 1, 2019, issued in counterpart JP Patent Application No. 2019-017291, w/English translation (5 pages).
Office Action dated Apr. 20, 2020, issued in counterpart KR application No. 10-2020-7005106, with English translation. (9 pages).
Office Action dated Aug. 7, 2020, issued in counterpart CN Application No. 201980004035.3, with English translation.(14 pages).
Extended (Supplementary) Search Report dated Oct. 27, 2020, issued in counterpart EP Application No. 19858628.1 (7 pages).

* cited by examiner

INSPECTION APPARATUS FOR HYDROGEN GAS DISPENSER

TECHNICAL FIELD

The present invention relates to an apparatus configured to inspect a hydrogen gas dispenser to determine whether or not the amount of hydrogen gas is accurately dispensed, and the like.

BACKGROUND ART

In recent years, fuel cell vehicles, such as fuel cell automobiles that use hydrogen gas as a power source instead of fossil fuels like gasoline, have attracted attention. In order to supply hydrogen gas to such automobiles, deployment of the facilities for supplying hydrogen gas, so-called hydrogen stations, has been promoted. Such hydrogen stations include a hydrogen gas dispenser configured to supply hydrogen gas to fuel cell vehicles. The hydrogen gas dispenser supplies hydrogen gas to a hydrogen gas tank provided in fuel cell vehicles. Such a hydrogen gas dispenser includes a flowmeter configured to measure the flow rate of hydrogen gas supplied to a fuel cell vehicle, a pressure indicator configured to measure the pressure of the hydrogen gas, and a temperature indicator configured to measure the temperature of the hydrogen gas.

If there is a difference between a measured value of the flow rate measured by the flowmeter and the flow rate of the hydrogen gas actually supplied, the amount of the hydrogen gas supplied to the automobile is too large or too small. Therefore, the flow rate measured by the flowmeter of the hydrogen gas dispenser, that is, the amount dispensed by the hydrogen gas dispenser is regularly inspected using a dispensed-amount inspection apparatus.

For example, Patent Document 1 discloses an inspection apparatus that achieves highly accurate evaluation of a wide range of measured values of a flow rate of gas measured by a built-in gas flowmeter in a hydrogen gas dispenser. The inspection apparatus includes a hydrogen tank and a gas flowmeter for evaluation that has been subjected to calibration and value assignment.

The hydrogen gas dispenser is set to supply hydrogen gas to fuel cell vehicles at a predetermined rate of pressure rise (target rate of pressure rise) by measuring the pressure and the temperature of the hydrogen gas with the pressure indicator and the temperature indicator.

A hydrogen gas dispenser is also regularly inspected by using a rate-of-pressure-rise inspection apparatus to determine whether or not the rate of pressure rise is within a predetermined range during its operation. The rate-of-pressure-rise inspection apparatus includes a hydrogen tank, a pressure indicator, and a temperature indicator.

PRIOR ART DOCUMENT

Patent Document

Patent Document 1: JP 2017-180612 A

SUMMARY OF THE INVENTION

In conventional techniques, an inspection apparatus configured to measure the amount of hydrogen gas dispensed by a hydrogen gas dispenser and an inspection apparatus configured to measure the rate of pressure rise are separately prepared, and the dispensed amount and the rate of pressure rise of the hydrogen gas dispenser are separately measured by the respective inspection apparatuses. However, the management and inspection work of the two inspection apparatuses is complicated.

In addition, each of the dispensed-amount inspection apparatus and the rate-of-pressure-rise inspection apparatus includes a hydrogen tank, and each hydrogen tank is configured to store exhaust gas (hydrogen gas after measurement). However, both of the inspection apparatuses include their respective hydrogen tanks, which makes it difficult to downsize the apparatuses, and also leads to an increase in costs.

Problems to be Solved by the Invention

A first object of the present invention is to provide an inspection apparatus configured to measure the dispensed amount and the rate of pressure rise of a hydrogen gas dispenser.

A second object of the present invention is to provide a relatively small and inexpensive inspection apparatus configured to measure the dispensed amount and the rate of pressure rise of a hydrogen gas dispenser.

Solutions to the Problems

An inspection apparatus for a hydrogen gas dispenser of the present invention includes a receiving-side gas flowing unit including a receptacle configured to be connected to a nozzle of a hydrogen gas dispenser and an inspection unit including a rate-of-pressure-rise inspection unit configured to measure a rate of pressure rise of hydrogen gas from the hydrogen gas dispenser and a dispensed-amount inspection unit configured to measure a dispensed amount of the hydrogen gas.

A preferred inspection apparatus for a hydrogen gas dispenser of the present invention further includes a discharging-side gas flowing unit provided downstream of the inspection unit, and having a nozzle configured to be connected to a receptacle of a hydrogen tank of a fuel cell vehicle, wherein the hydrogen gas that has passed through the inspection unit is supplied from the discharging-side gas flowing unit to the hydrogen tank of the fuel cell vehicle.

Preferably, the inspection apparatus for a hydrogen gas dispenser of the present invention further includes a communication unit configured to acquire pressure information in the hydrogen tank of the fuel cell vehicle and a determination unit configured to compare the pressure information of the hydrogen tank with pressure of the hydrogen gas measured by the inspection unit.

Effects of the Invention

According to the present invention, the dispensed amount and the rate of pressure rise of the hydrogen gas dispenser can be measured by one inspection apparatus, thereby simplifying the inspection work.

Further, a preferred inspection apparatus of the present invention utilizes a hydrogen tank of existing fuel cell vehicles, thereby achieving downsizing of the apparatus and further cost reduction.

EMBODIMENTS OF THE INVENTION

[Existing Hydrogen Gas Dispenser and Fuel Cell Vehicle]

In this specification, a hydrogen gas dispenser refers to an apparatus configured to supply hydrogen gas to a hydrogen tank of a fuel cell vehicle. The hydrogen gas dispenser is inspected by the inspection apparatus of the present invention at appropriate intervals or when an error is suspected.

In this specification, a fuel cell vehicle refers to a vehicle including a hydrogen tank and a fuel cell. A fuel cell vehicle typically refers to a vehicle driven by fuel cell power (not only a vehicle using only a fuel-cell-power drive system, but also a vehicle using both a fuel-cell-power drive system and another drive system using gasoline or the like). Examples of the fuel cell vehicle include a fuel cell automobile, a fuel cell bus, a fuel cell freight vehicle such as a fuel cell truck, a fuel cell cargo handling vehicle such as a fuel cell forklift, a fuel cell train, and the like. A fuel cell refers to a battery that generates power by an electrochemical reaction between the hydrogen supplied and oxygen in the air or the like.

Many known fuel cell vehicles include measuring instruments (a pressure indicator and a temperature indicator) for measuring the pressure and the temperature in the hydrogen tank, and further include a communication means configured to transmit information on the pressure and the temperature in the hydrogen tank measured by the measuring instruments to the outside. The communication means often employs an infrared communication system. For example, an infrared transmitter is provided in a receptacle of a hydrogen tank.

A nozzle of the hydrogen gas dispenser includes an infrared receiver configured to receive infrared light from the infrared transmitter provided in the receptacle.

The hydrogen gas dispenser receives information on the pressure and the temperature in the hydrogen tank by the infrared communication (communication means) when the nozzle is connected to the receptacle of the hydrogen tank, recognizes the current pressure and the current temperature in the hydrogen tank, and supplies hydrogen gas to the hydrogen tank according to a predetermined protocol. The protocol is specified in the compressed hydrogen fueling technical standard JPEC-S 0003. The hydrogen gas dispenser is configured to fill the fuel cell vehicle with hydrogen gas at an appropriate rate of pressure rise according to the protocol on the basis of the outside air temperature and the values of the temperature and the pressure in the hydrogen tank.

Note that the compressed hydrogen fueling technical standard JPEC-S 0003 is continually revised, and thus the latest version thereof should be used for the protocol. The currently used version is JPEC-S 0003 (2014) revised on Oct. 10, 2014 by Japan Petroleum Energy Center.

[Inspection Apparatus for Hydrogen Gas Dispenser According to First Embodiment]

Figure 1:
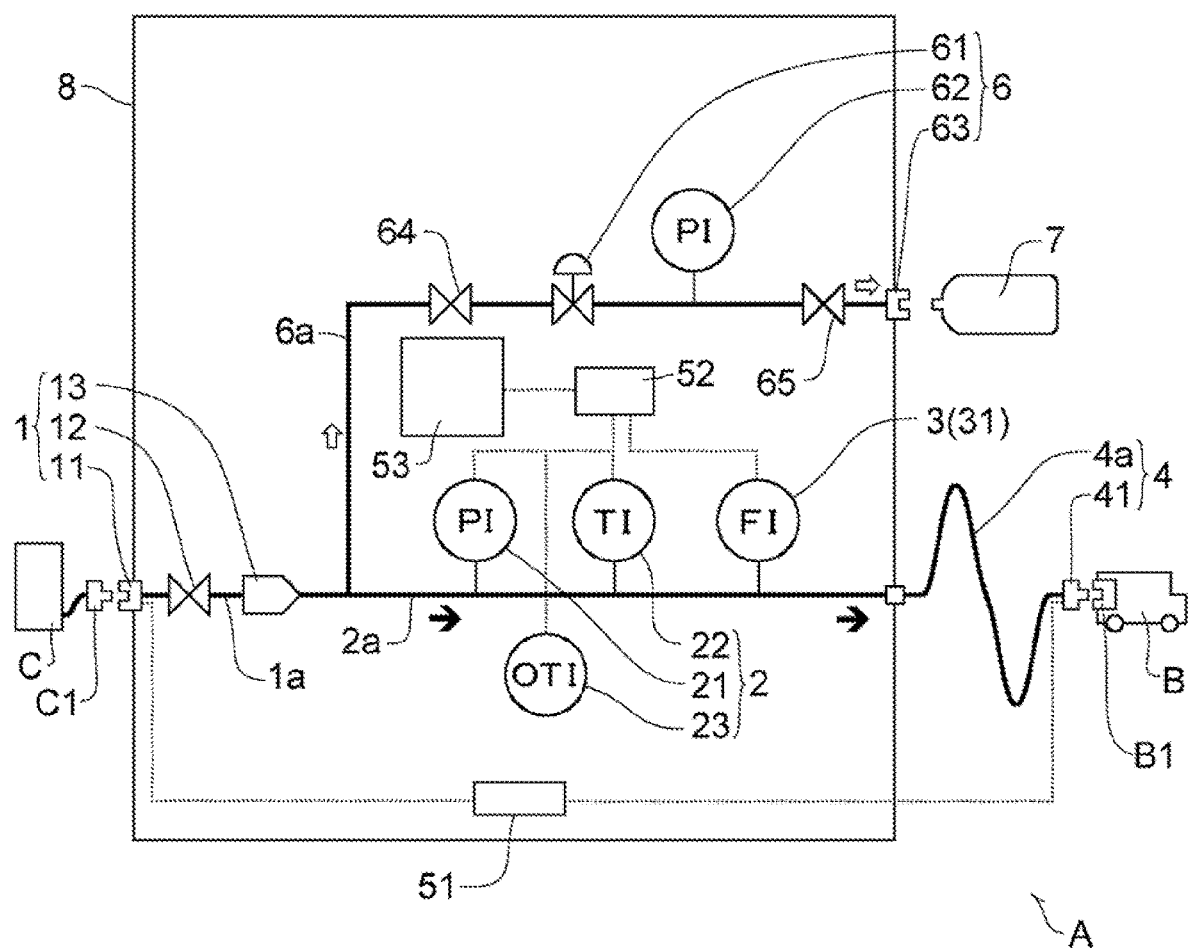
FIG. 1 is a schematic view illustrating an inspection apparatus for a hydrogen gas dispenser according to a first embodiment.

Referring to FIG. 1, an inspection apparatus A of the present invention includes: a receiving-side gas flowing unit 1 configured to receive hydrogen gas from a hydrogen gas dispenser C; an inspection unit including a rate-of-pressure-rise inspection unit 2 configured to measure a rate of pressure rise of the hydrogen gas from the gas receiving-side flow unit 1, and a dispensed-amount inspection unit 3 configured to measure a dispensed amount of the hydrogen gas; a discharging-side gas flowing unit 4 provided downstream of the inspection unit; a communication unit 51 configured to obtain at least pressure information on a pressure in a hydrogen tank of a fuel cell vehicle; a control unit 52 including a determination unit that compares the pressure information of the hydrogen tank with a measured pressure of the hydrogen gas; and a display 53 configured to display various information. If necessary, the inspection apparatus A may further include a printer (not shown).

For example, a single case body 8 includes at least the inspection unit including the rate-of-pressure-rise inspection unit 2 and the dispensed-amount inspection unit 3, the communication unit 51, and the display 53, and preferably further includes the receiving-side gas flowing unit 1. The inspection apparatus A of the present invention is configured as a single device in which the rate-of-pressure-rise inspection unit 2 and the dispensed-amount inspection unit 3 are integrated, and thus can be made to have a size and weight portable by a user, for example.

In this specification, the terms "downstream" and "upstream" indicate the directions with reference to the hydrogen gas flowing in the inspection apparatus. The downstream indicates a side in which the hydrogen gas flows, and the upstream indicates the opposite side thereof (toward the portion where the hydrogen gas enters).

<Receiving-Side Gas Flowing Unit>

The receiving-side gas flowing unit 1 includes: a receptacle 11 provided at the upstream end of a pipe 1a through which hydrogen gas flows, and connectable to a nozzle C1 of the hydrogen gas dispenser C; and an opening/closing valve 12 provided in a middle portion of the pipe 1a. The receiving-side gas flowing unit 1 may include a check valve 13 as necessary.

The receptacle 11 of the receiving-side gas flowing unit 1 is provided with a transmitting means (not shown) configured to transmit information to the nozzle C1 of the hydrogen gas dispenser C. For example, the receptacle 11 is provided with an infrared transmitter (not shown) configured to transmit infrared light to an infrared receiver of the nozzle C1 of the hydrogen gas dispenser C which is to be inspected.

<Inspection Unit>

The inspection unit includes: a main pipe 2a through which hydrogen gas flows; and the rate-of-pressure-rise inspection unit 2 and the dispensed-amount inspection unit 3 provided in a middle portion of the main pipe 2a, and further includes an extraction unit 6 configured to extract hydrogen gas for sampling, if necessary.

The rate-of-pressure-rise inspection unit 2 includes: a pressure indicator 21 configured to measure the pressure of hydrogen gas flowing through the main pipe 2a; a temperature indicator 22 configured to measure the temperature of the hydrogen gas; and an outside-air temperature indicator 23 configured to measure the outside air temperature. It is assumed that the pressure indicator 21, the temperature indicator 22 for hydrogen gas, and the outside-air temperature indicator 23 of the rate-of-pressure-rise inspection unit 2 are all accurate (reliable). The upstream end of the main pipe 2a is connected to the downstream end of the pipe 1a of the receiving-side gas flowing unit 1.

Here, it is assumed that all instruments (e.g., the temperature indicator and the pressure indicator) used in the inspection apparatus A for a hydrogen gas dispenser of the present invention are all accurate (reliable). For example, the inspection apparatus A of the present invention can use instruments that has been calibrated by a standard based on calibration accreditation of Japan Calibration Service System (JCSS) (the traceability system of measurement law based on the Measurement Law).

The dispensed-amount inspection unit 3 includes a flowmeter 31 configured to measure the flow rate of hydrogen gas flowing through the main pipe 2a. It is assumed that the flowmeter 31 of the dispensed-amount inspection unit 3 is accurate (reliable). The flowmeter 31 of the dispensed-amount inspection unit 3 can also employ a JCSS accreditation product as mentioned above, for example, a flowmeter that has been subjected to calibration and value assignment using a standard gas flowmeter as disclosed in JP 2017-180612 A (this standard gas flowmeter is also a JCSS accreditation product of calibration).

<Extraction Unit>

The extraction unit 6 includes a pressure reducing valve 61, a pressure indicator 62, and a connector 63 for receiving a cylinder 7 configured to store hydrogen gas for sampling that are provided in a sub-pipe 6a branched from the main pipe 2a. The cylinder 7 can be attached to the connector 63 in a detachable manner. Opening/closing valves 64, 65 are provided between the main pipe 2a and the pressure reducing valve 61 and between the pressure indicator 62 and the connector 63, respectively.

<Discharging-Side Gas Flowing Unit>

The discharging-side gas flowing unit 4 includes a pipe 4a through which the hydrogen gas flows, and a nozzle 41 provided at the downstream end of the pipe 4a and connectable to a hydrogen tank. The nozzle 41 can be connected to, for example, a receptacle of a hydrogen tank of a fuel cell vehicle. The upstream end of the pipe 4a is connected to the downstream end of the main pipe 2a of the inspection unit. The pipe 4a of the discharging-side gas flowing unit 4 employs a flexible pipe for easy connection to a receptacle of a hydrogen tank of a fuel cell vehicle.

The pipe 1a of the receiving-side gas flowing unit 1, and the main pipe 2a and the sub-pipe 6a of the inspection unit employ hard pipes (pipes that do not easily bend), such as steel pipes, but may also employ flexible pipes. Each of these pipes is a pipe having excellent pressure resistance against high-pressure gas.

The nozzle 41 of the discharging-side gas flowing unit 4 is provided with a receiving means (not shown) configured to receive information on the inside of a hydrogen tank of a known fuel cell vehicle. For example, the nozzle 41 is provided with an infrared receiver (not shown) configured to receive infrared light from an infrared transmitter of a receptacle of a hydrogen tank of a fuel cell vehicle.

The information on the inside of the hydrogen tank includes at least information on the pressure and the temperature in the hydrogen tank. The information may include other information such as the capacity of the hydrogen tank.

<Communication Unit>

The communication unit 51 receives the information on the inside of the hydrogen tank acquired by the infrared receiver (receiving means) provided in the nozzle 41 of the discharging-side gas flowing unit 4, and transmits the information as it is to the receptacle 11 of the receiving-side gas flowing unit 1.

The communication unit 51 stores the information on the inside of the hydrogen tank in a memory, and displays the information on the display 53 in real time as necessary.

<Monitor, Control Unit, Etc.>

The display 53 of the inspection apparatus A displays various information. The inspection apparatus A is provided with the control unit 52 to execute an inspection described later.

The control unit 52 includes a determination unit configured to compare the information on the pressure in the hydrogen tank with the measured pressure of the hydrogen gas. The function of the determination unit will be described later. The control unit 52 is configured to process information on, for example, the pressure acquired from the measuring instrument or the like, and includes a program to operate the device appropriately.

[Inspection Method for Hydrogen Gas Dispenser Using Inspection Apparatus]

The inspection apparatus A of the first embodiment utilizes a hydrogen tank of fuel cell vehicles instead of being equipped with a tank for collecting hydrogen gas that is to be taken out from the hydrogen gas dispenser C during an inspection. In utilizing a hydrogen tank of existing fuel cell vehicles for the inspection apparatus A as mentioned above, some fuel cell vehicles may include a hydrogen tank that affects the inspection of the hydrogen gas dispenser and prevents the hydrogen gas dispenser from being inspected properly. In the present invention, the suitability of a hydrogen tank of fuel cell vehicles to be utilized for the inspection of a hydrogen gas dispenser is determined.

With all of the opening/closing valves 12, 64, 65 being closed, the nozzle 41 of the discharging-side gas flowing unit 4 is connected to a receptacle B1 of a hydrogen tank (not shown) of a fuel cell vehicle B, as shown in FIG. 1. The fuel cell vehicle B can employ an existing fuel cell automobile equipped with a communication means.

When the nozzle 41 is connected to the receptacle B, information, such as pressure information and temperature information of the hydrogen tank, enters the communication unit 51, then is stored in the memory of the inspection apparatus A and also displayed on the display 53. Communication between the communication unit 51 and the fuel cell vehicle B is sequentially performed at predetermined intervals, so that information, such as pressure information, from the hydrogen tank is updated at the predetermined intervals.

Next, the nozzle C1 of the hydrogen gas dispenser C to be inspected is connected to the receptacle 11 of the receiving-side gas flowing unit 1. When the nozzle C1 is connected to the receptacle 11, information, such as pressure information and temperature information of the hydrogen tank, is transmitted from the communication unit 51 to the hydrogen gas dispenser C through the receptacle 11.

The communication between the communication unit 51 and the hydrogen gas dispenser C is updated each time when information from the hydrogen tank is updated. That is, when new information is acquired from the hydrogen tank, the communication unit 51 transmits the information to the hydrogen gas dispenser C in real time, so that the inspection apparatus A and the hydrogen gas dispenser C share the same information on the hydrogen tank.

The inspection apparatus A may be connected to the fuel cell vehicle B after being connected to the hydrogen gas dispenser C, or both connections may be made simultaneously.

In the case where the temperature in the hydrogen tank acquired at the time of connection is out of a predetermined range of temperature, the control unit 52 of the inspection apparatus A determines that the hydrogen tank of the fuel cell vehicle B is unsuitable to be used for the inspection. When such determination has been made, the inspection apparatus A is configured to issue a warning by a desired way, such as (a) displaying on the display 53, (b) sounding a warning buzzer, and/or (c) turning on a warning lamp.

According to the protocol of the compressed hydrogen fueling technical standard (JPEC-S 0003), hydrogen gas may not be supplied to a hydrogen tank having a temperature of 85° C. or higher. Note that the upper limit of the predetermined temperature is 85° C. as mentioned above, and the lower limit thereof is −40° C. That is, the range of the predetermined temperature is −40° C. to 85° C. according to the current protocol. Accordingly, when the temperature of the hydrogen tank connected to the inspection apparatus A is out of the range of the predetermined temperature (especially when the temperature exceeds the upper limit temperature), an accurate inspection cannot be performed for the gas supply of the hydrogen gas dispenser C pursuant to the above protocol, even if hydrogen gas is supplied from the hydrogen gas dispenser C to the inspection apparatus A.

Therefore, the fuel cell vehicle B including the hydrogen tank that has been determined by the inspection apparatus A to be unsuitable for use in view of its temperature is removed and replaced with another fuel cell vehicle.

Next, the opening/closing valve 12 of the receiving-side gas flowing unit 1 is opened to supply hydrogen gas from the hydrogen gas dispenser C to the inspection apparatus A for preparation, and then, the inspection apparatus A is set stationary while the supply of the hydrogen gas is suspended. The preparatory supply of hydrogen gas may be performed for about 5 seconds, for example. The thick arrows in FIG. 1 indicate the direction in which the hydrogen gas flows.

The hydrogen gas supplied from the hydrogen gas dispenser C is charged into the hydrogen tank of the fuel cell vehicle B through the pipe 1a of the receiving-side gas flowing unit 1, the main pipe 2a of the inspection unit, and the pipe 4a of the discharging-side gas flowing unit 4.

The preparatory supply allows the main pipe 2a of the inspection apparatus A and the hydrogen tank to be filled with the hydrogen gas, and the pressure and the temperature of the hydrogen gas in the main pipe 2a are measured by the pressure indicator 21 and the temperature indicator 22 of the inspection unit. As necessary, the pressure and the temperature of the hydrogen gas in the main pipe 2a measured by the inspection unit are displayed on the display 53.

When the preparatory supply is stopped and the inspection apparatus A is set stationary, the pressure in the main pipe 2a becomes equal to the pressure in the hydrogen tank in theory. However, the values may not be exactly the same in practice. When the pressure of the hydrogen gas in the main pipe 2a measured by the inspection unit is assumed as 100%, the value of the pressure in the hydrogen tank (the value of the pressure in the hydrogen tank transmitted from the hydrogen tank to the inspection apparatus A by the communication means) within ±2.5%, preferably within ±1.0% can be determined to be a normal value. That is, the hydrogen tank can be determined to be normal when the relationship: 97.5%≤pressure in the hydrogen tank/pressure in the main pipe 2a≤102.5% (hereinafter, referred to as relationship 1), preferably the relationship: 99.0%≤pressure in the hydrogen tank/pressure in the main pipe 2a≤101.0% is satisfied.

The determination unit of the inspection apparatus A compares the value of the pressure in the main pipe 2a acquired by the inspection unit with the value of the pressure included in the information from the hydrogen tank, and determines whether or not the relationship 1 is satisfied.

Since the pressure of the hydrogen tank may change with time, whether or not the relationship 1 is continuously satisfied is determined while maintaining the stationary state for about 2 to 5 seconds.

The reason for not satisfying the above relationship 1 may be: (d) an abnormality of the pressure indicator provided in the fuel cell vehicle B; (e) a gas leak of the hydrogen tank or the receptacle B1; or/and (f) other unexpected abnormalities.

When the relationship 1 is determined to be not satisfied, the inspection apparatus A determines that the hydrogen tank of the fuel cell vehicle B is unsuitable for use. When such determination has been made, the inspection apparatus A is configured to issue a warning by a desired way, such as (a) displaying on the display 53, (b) sounding a warning buzzer, and/or (c) turning on a warning lamp.

According to the protocol of the compressed hydrogen fueling technical standard (JPEC-S 0003), the rate of pressure rise and the amount to be dispensed at the time of fueling are defined on the basis of the relationship between the pressure of the hydrogen tank and the outside air temperature. When the pressure of the hydrogen tank is abnormal, an accurate inspection cannot be performed for the gas supply of the hydrogen gas dispenser C pursuant to the above protocol.

Therefore, the fuel cell vehicle B including the hydrogen tank that has been determined to be unsuitable for use in view of its pressure by the inspection apparatus A including the determination unit is removed and replaced with another fuel cell vehicle.

After completion of the above determination as to suitability of a hydrogen tank, the inspection apparatus A is connected with the fuel cell vehicle B having a hydrogen tank that does not affect the result of the inspection of the hydrogen gas dispenser C.

The inspection of the hydrogen gas dispenser C is started while supplying hydrogen gas from the hydrogen gas dispenser C connected to the inspection apparatus A. The supply of the hydrogen gas required for the inspection may be performed for about 3 to 5 minutes, for example. The supplied hydrogen gas is charged into the hydrogen tank of the fuel cell vehicle B through the pipe 1a of the receiving-side gas flowing unit 1, the main pipe 2a of the inspection unit, and the pipe 4a of the discharging-side gas flowing unit 4.

As described above, the hydrogen gas dispenser C sequentially receives information, such as pressure information and temperature information of the hydrogen tank, through the communication unit 51 of the inspection apparatus A. The hydrogen gas dispenser C dispenses the hydrogen gas at a rate of pressure rise according to the protocol on the basis of the information (mainly pressure information) and the outside temperature. At this time, the rate-of-pressure-rise inspection unit 2 of the inspection apparatus A determines whether or not the rate of pressure rise of the hydrogen gas of the main pipe 2a (i.e., hydrogen gas supplied from the hydrogen gas dispenser C) complies with the protocol on the basis of the pressure information sequentially received from the hydrogen tank and the outside temperature measured by the outside-air temperature indicator 23. The dispensed-amount inspection unit 3 of the inspection apparatus A determines whether or not the dispensed amount of the hydrogen gas flowing in the main pipe 2a complies with the protocol. The results of these inspections are displayed on the display 53 or printed by a printer, as necessary.

When the results of the inspection of the hydrogen gas dispenser C for the rate of pressure rise and the dispensed amount shows inaccuracy, the hydrogen gas dispenser C is subjected to calibration after the inspection apparatus A is detached from the hydrogen gas dispenser C.

When the inspection has been completed, the hydrogen gas dispenser C and the fuel cell vehicle B are detached from the inspection apparatus A. However, sampling of the hydrogen gas may also be performed as needed.

Specifically, after completion of the inspection, the fuel cell vehicle B is detached, the cylinder 7 under vacuum is attached to the connector 63 of the extraction unit 6, the opening/closing valves 64, 65 are opened, and then a small amount of hydrogen gas is supplied from the hydrogen gas dispenser C. This allows the supplied hydrogen gas to flow through the sub-pipe 6a, pass through the pressure reducing valve 61, and be stored into the cylinder 7. Note that the white arrow in FIG. 1 indicates the flowing direction of the hydrogen gas to be extracted into the cylinder 7 for sampling. The hydrogen gas stored in the cylinder 7 is used as a sample for a quality inspection.

[Effects of the Inspection Apparatus of the Present Invention]

According to the present invention, the dispensed amount and the rate of pressure rise of a hydrogen gas dispenser can be measured with a single inspection apparatus A. The dispensed amount and the rate of pressure rise of the hydrogen gas dispenser can be simultaneously measured by one-time inspection work as described above, and thus the inspection work can be simplified and the time required for the inspection can be shortened. In addition, management of one inspection apparatus A is simple.

Further, the inspection apparatus A of the present invention stores hydrogen gas dispensed during the inspection into a hydrogen tank of an existing fuel cell vehicle, which eliminates the need to provide a tank in the inspection apparatus A. With this configuration, downsizing of the apparatus and further cost reduction can be achieved. The hydrogen gas that has been subjected to the inspection and supplied to the hydrogen tank can be used for driving the fuel cell vehicle B, thereby enabling the gas to be consumed without waste.

In addition, the inspection apparatus A of the present invention ensures an accurate inspection of the hydrogen gas dispenser, as the inspection apparatus A determines whether or not a hydrogen tank is suitable for inspection (whether or not the hydrogen tank affects the inspection of the hydrogen gas dispenser) before using the hydrogen tank of a fuel cell vehicle, as described above.

[Inspection Apparatus for Hydrogen Gas Dispenser According to Second Embodiment]

Figure 2:
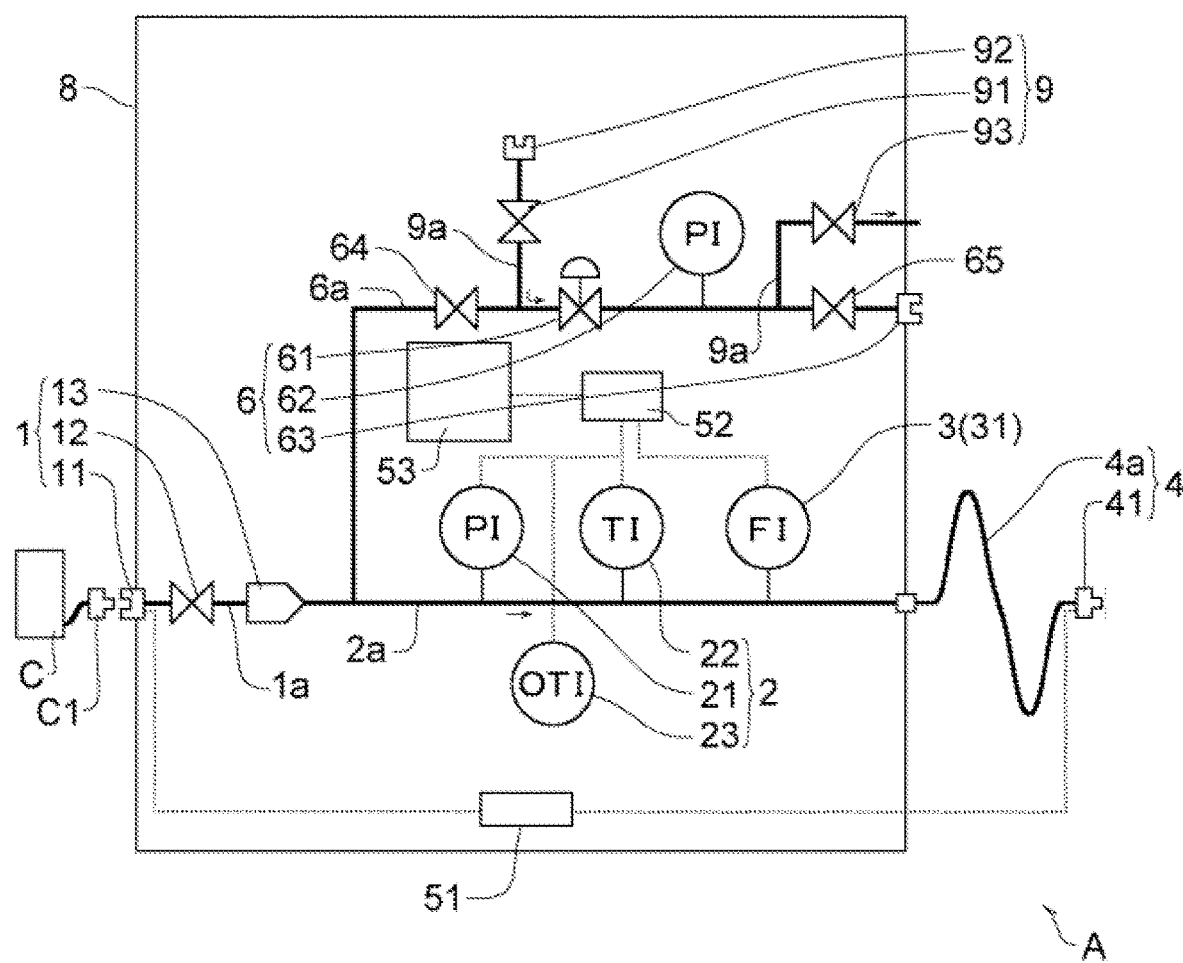
FIG. 2 is a schematic view illustrating an inspection apparatus for a hydrogen gas dispenser according to a second embodiment.

FIG. 2 is a schematic diagram showing an inspection apparatus A for a hydrogen gas dispenser according to a second embodiment.

The inspection apparatus A according to the second embodiment is the same as the inspection apparatus A according to the first embodiment except that a purge unit 9 is provided. Therefore, the description of the same configuration as that of the first embodiment is omitted, and the same terms and reference numerals are used.

Referring to FIG. 2, the purge unit 9 includes: an opening/closing valve 91 provided on a pipe 9a branched from the sub-pipe 6a between the opening/closing valve 64 and the pressure reducing valve 61; a receptacle 92; and an opening/closing valve 93 provided on a pipe 9a branched from the sub-pipe 6a between the pressure reducing valve 61 and the opening/closing valve 65. The downstream side of the opening/closing valve 93 is opened for venting or connected to a collecting cylinder.

[Inspection Method of Second Embodiment]

The inspection apparatus A according to the second embodiment can perform a purge operation to clear the main pipe 2a and the like in the inspection apparatus by using hydrogen gas at an initial stage of inspecting the hydrogen gas dispenser.

Specifically, in the inspection apparatus A shown in FIG. 2, the nozzle 41 of the discharging-side gas flowing unit 4 is connected to the receptacle 92 of the purge unit 9. The nozzle C1 of the hydrogen gas dispenser C is connected to the receptacle 11 while the opening/closing valves 64, 65 are closed and the opening/closing valves 12, 91, 93 are opened, and then a small amount of hydrogen gas is supplied from the hydrogen gas dispenser C. The hydrogen gas is introduced into the pipe 9a of the purge unit 9 through the main pipe 2a and the pipe 4a, depressurized by the pressure reducing valve 61, and then vented to the outside through the opening/closing valve 93 (or collected into a collecting cylinder). Performing the purge operation before the inspection enhances the reliability of inspection. The thin arrows in FIG. 2 indicate the direction in which hydrogen gas flows during the purge operation.

After the purge operation, the hydrogen gas dispenser C is inspected in the same manner as the inspection apparatus A of the first embodiment.

Another Embodiment

The inspection apparatus A of the first and the second embodiments utilizes a hydrogen tank of existing fuel cell vehicles at the time of inspection, but the configuration is not limited thereto. The inspection apparatus itself may include a hydrogen tank to receive the hydrogen gas from the hydrogen gas dispenser (not shown).

REFERENCE SIGNS LIST

A Inspection apparatus
B Fuel cell vehicle
B1 Receptacle of hydrogen tank of fuel cell vehicle
C Hydrogen gas dispenser
C1 Nozzle of hydrogen gas dispenser
1 Receiving-side gas flowing unit
2 Rate-of-pressure-rise inspection unit
3 Dispensed-amount inspection unit
4 Discharging-side gas flowing unit
51 Communication unit
52 Control unit

The invention claimed is:

1. An inspection apparatus for a hydrogen gas dispenser supplying hydrogen gas at a rate of pressure rise according to a protocol, the inspection apparatus comprising:
   a receiving-side gas flowing unit including a receptacle configured to be connected to a nozzle of the hydrogen gas dispenser;
   an inspection unit including a rate-of-pressure-rise inspection unit configured to measure the rate of pressure rise of the hydrogen gas received through the receptacle from the hydrogen gas dispenser and a dispensed-amount inspection unit configured to measure a dispensed amount of the hydrogen gas received through the receptacle from the hydrogen gas dispenser; and
   a determination unit configured to determine an abnormality for the supplying of the hydrogen gas according to the protocol based on the rate of pressure rise of the hydrogen gas and the dispensed amount of the hydrogen gas measured by the inspection unit.

2. The inspection apparatus according to claim 1, further comprising a discharging-side gas flowing unit provided downstream of the inspection unit, and having a nozzle configured to be connected to a receptacle of a hydrogen tank of a fuel cell vehicle, wherein the hydrogen gas that has passed through the inspection unit is supplied from the discharging-side gas flowing unit to the hydrogen tank of the fuel cell vehicle.

3. The inspection apparatus according to claim 2, further comprising a communication unit configured to acquire pressure information in the hydrogen tank of the fuel cell vehicle, wherein the determination unit is further configured to compare the pressure information of the hydrogen tank with pressure of the hydrogen gas measured by the inspection unit to determine the abnormality.

4. The inspection apparatus according to claim 1, wherein the inspection unit includes a main pipe through which the hydrogen gas flows.

5. The inspection apparatus according to claim 4, further comprising a purge unit for purging the main pipe with hydrogen gas.

6. The inspection apparatus according to claim 3, wherein the determination unit determines the abnormality when a relationship 1 is not satisfied, the relationship 1 being: $97.5\% \leq$ the pressure information of the hydrogen tank/the pressure of the hydrogen gas measured by the inspection unit $\leq 102.5\%$.

* * * * *